(12) United States Patent
Bharatkumar et al.

(10) Patent No.: US 10,749,771 B2
(45) Date of Patent: Aug. 18, 2020

(54) EXTENSIBLE, SECURE AND EFFICIENT MONITORING AND DIAGNOSTIC PIPELINE FOR HYBRID CLOUD ARCHITECTURE

(71) Applicant: MICROSOFT TECHNOLOGY LICENSING, LLC, Redmond, WA (US)

(72) Inventors: Bhatt Rutwick Bharatkumar, Sammamish, WA (US); Asudani Mohit, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 172 days.

(21) Appl. No.: 15/983,280

(22) Filed: May 18, 2018

(65) Prior Publication Data
US 2019/0356566 A1 Nov. 21, 2019

(51) Int. Cl.
| | |
|---|---|
| H04L 12/26 | (2006.01) |
| G06F 16/178 | (2019.01) |
| G06F 21/62 | (2013.01) |
| H04L 12/24 | (2006.01) |
| H04L 29/08 | (2006.01) |
| G06F 21/64 | (2013.01) |

(52) U.S. Cl.
CPC ......... *H04L 43/067* (2013.01); *G06F 16/178* (2019.01); *G06F 21/6218* (2013.01); *G06F 21/64* (2013.01); *H04L 41/069* (2013.01); *H04L 41/0631* (2013.01); *H04L 67/1095* (2013.01); *H04L 67/1097* (2013.01)

(58) Field of Classification Search
CPC ............... H04L 43/067; H04L 67/1097; H04L 67/1095; H04L 41/069; H04L 41/0631; G06F 21/64; G06F 21/6218; G06F 16/178; G06F 11/3006; G06F 11/3075
See application file for complete search history.

(56) References Cited

U.S. PATENT DOCUMENTS

| | | | | |
|---|---|---|---|---|
| 10,498,617 | B1* | 12/2019 | Dothan | ................... H04L 67/26 |
| 2007/0073519 | A1 | 3/2007 | Long | |
| 2012/0204187 | A1 | 8/2012 | Breiter et al. | |
| 2012/0266258 | A1* | 10/2012 | Tuchman | .............. H04L 63/104 |
| | | | | 726/28 |

(Continued)

OTHER PUBLICATIONS

"International Search Report and Written Opinion Issued in PCT Patent Application No. PCT/US2019/030789", dated Sep. 16, 2019, 13 Pages.(MS# 404336-WO-PCT).

*Primary Examiner* — Michael Pyzocha
(74) *Attorney, Agent, or Firm* — Workman Nydegger (57) ABSTRACT

Systems are provided for facilitating the disclosed methods for performing event storage and diagnostic processing within a hybrid cloud environment. Event records are gathered and batched at an on-premises server. The event records are also appended with correlation vector data that enables the event records to be correlated with other events. The batch of event record batches are signed with a security key associated with a cloud storage container and the on-premises server is restricted to writing the batch of event records to the container. In some instances, the size of the batch is based on a duration of time for collecting records, which can be adjusted to accommodate for missing data.

20 Claims, 4 Drawing Sheets

(56) References Cited

U.S. PATENT DOCUMENTS

| | | | |
|---|---|---|---|
| 2012/0272249 A1* | 10/2012 | Beaty | G06F 9/5083 |
| | | | 719/318 |
| 2013/0031247 A1 | 1/2013 | Dhuse et al. | |
| 2013/0080642 A1* | 3/2013 | Adam | G06F 15/173 |
| | | | 709/226 |
| 2014/0040196 A1* | 2/2014 | Wijayaratne | G06F 16/11 |
| | | | 707/624 |
| 2014/0101102 A1* | 4/2014 | Baumgarten | G06F 16/27 |
| | | | 707/634 |
| 2015/0172260 A1* | 6/2015 | Brenner | H04L 63/083 |
| | | | 713/171 |
| 2015/0254328 A1* | 9/2015 | Dereszynski | G06Q 30/0277 |
| | | | 707/739 |
| 2015/0281233 A1* | 10/2015 | Asenjo | G06F 21/44 |
| | | | 726/7 |
| 2016/0103699 A1* | 4/2016 | Thakkar | G06F 9/45558 |
| | | | 718/1 |
| 2016/0366185 A1* | 12/2016 | Lee | H04L 63/20 |
| 2017/0270450 A1* | 9/2017 | Binotto | H04L 41/046 |
| 2018/0176244 A1* | 6/2018 | Gervais | G06F 21/552 |
| 2018/0248941 A1* | 8/2018 | Naik | H04L 67/1031 |
| 2018/0373617 A1* | 12/2018 | Gaier | G06F 11/3612 |
| 2019/0007206 A1* | 1/2019 | Surla | H04L 9/0822 |
| 2019/0082026 A1* | 3/2019 | Wu | H04L 9/0861 |
| 2019/0146424 A1* | 5/2019 | Buda | G05B 13/021 |
| | | | 700/28 |

* cited by examiner

EXTENSIBLE, SECURE AND EFFICIENT MONITORING AND DIAGNOSTIC PIPELINE FOR HYBRID CLOUD ARCHITECTURE

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

When a client utilizes distributed computing resources, such as provided through cloud services, they want to be assured that the computing resources will behave reliably, in a predictable manner, with a desired quality of service. Unfortunately, computers and computer networks do not always behave as desired. For instance, computer performance can be degraded by hardware failures, software failures and/or malware.

Many solutions have been developed for monitoring computing events within a discrete system, to determine whether that discrete system is behaving reliably, in a predictable manner, and with a desired quality of service. Likewise, some systems have been developed for monitoring events managed exclusively by a cloud service.

However, there are no current systems that provide monitoring capabilities that are capable of monitoring events within a hybrid system that includes both on-premises servers and distributed cloud services, and particularly not in a way that enables a consumer to have visibility into the specific events occurring at specific on-premises servers and particularly not in a way that enables the correlation of related events occurring at different servers or cloud service systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed and claimed embodiments include systems and methods that provide an extensible, secure and efficient monitoring and diagnostic pipeline for hybrid cloud architectures and, even more particularly, systems and methods for facilitating the manner in which event storage and diagnostic processing is performed in a hybrid cloud environment.

In some instances, methods are provided for performing event storage and diagnostic processing within a hybrid cloud environment by configuring on-premises servers to generate and batch event records corresponding to machines monitored by the on-premises servers. The event records are also appended with correlation vector data that enables the event records to be correlated with other events associated with different cloud systems and services. In some instances, the batch of event record batches are signed with a security key that is associated with a particular cloud storage container dedicated to storing event records for the associated on-premises server. In some instances, the size of the batch of records is based on a duration of time for collecting the event records, which can be adjusted to accommodate for data that was omitted from a previous batch of event records.

In some embodiments, the disclosed methods are implemented at an on-premises computing system that is incorporated into a hybrid cloud environment that includes the on-premises computing system, as well as a cloud storage entity and a cloud file sync service. The on-premises computing system comprises one or more processors and one or more computer-readable media having stored instructions that are executable by the one or more processors to implement the disclosed methods for performing event storage and diagnostic processing.

In some embodiments, the on-premises computing system implements the disclosed methods by performing a plurality of acts, including an act of identifying a plurality of different monitoring events of one or more machines included with or otherwise associated with the on-premises computing system during a predetermined batch period of time and an act of generating a plurality of event records corresponding to the plurality of different monitoring events detected during the predetermined batch period of time. The process for generating the plurality of event records includes the on-premises computing system determining a format to configure each event record with, selectively based on a type of monitoring event associated with each event record. The formats for configuring the event records include at least two different event record format types, namely an uncompressed bond type that includes a plurality of different event information and which is used for telemetry events and a compressed type that contains more data than contained by the bond type, only in a compressed state, and which is used for diagnostic type events.

The on-premises computing system also generates appended event records by appending the event records with correlation vector data that identifies, for each event record, a context associated with the monitored event that is associated with the event record. This appended correlation vector data can be used by subsequent systems for correlating events between different on-premises systems within the hybrid cloud environment and/or different cloud systems or services.

Next, a batch of event records is generated by the on-premises computing system batching all of the appended event records that correspond to the different monitoring events that were identified during the predetermined batch period of time. The batch of records can also include, in some instances, additional event records that were gathered outside of the original batch period of time (and that correspond to an extended batch period of time), when notice is received that certain additional event records are needed. The batch of event records is signed with or associated with a security key that is obtained from the cloud file sync service and then transmitted to the cloud storage entity. The security key is uniquely associated with a corresponding security key provided to the cloud storage by the cloud file sync service for restricting access to a particular storage container managed by the cloud storage and which is associated with the on-premises computing system. In some instances, this security key restricts the rights of the on-premises system to only write access.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed and claimed embodiments include systems and methods for facilitating event storage and diagnostic processing within hybrid cloud environments.

In some instances, the disclosed embodiments can be used to help overcome some of the technical difficulties and problems associated with existing techniques for performing event record storage and diagnostic processing within hybrid cloud environments that include on-premises servers and cloud storage containers and cloud file sync services. For instance, some embodiments can be utilized to help improve correlation between different related events, improve security of stored event records, improve handling of event records (particularly during transmission) to reduce computational loads associated with handling event records, and improving techniques for mitigating against errors that can occur during the event record processing.

In some instances, event record agents are executed within on-premises servers to generate and batch event records corresponding to machines monitored by the on-premises servers. The event records are also appended at the on-premises servers with correlation vector data that enables the event records to be correlated with other events associated with different cloud systems and services. In some instances, the batches of event records are signed with security keys that are associated with corresponding cloud storage containers dedicated to storing event records for the associated on-premises servers, respectively.

In some instances, the duration of time for generating and batching event records is adjusted to accommodate for data that was omitted from a previous batch of event records. Further, in some instances, the event records are formatted differently, selectively based on a type and/or frequency of monitored event, to reduce the overhead associated with processing and transmitting at least the high frequency type events. For instance, in some embodiments, the on-premises servers use a first and more expensive format (which requires relatively more data and higher storage requirements), like the Bond format, for transmitting low frequency events such as telemetry data like performance metrics, heartbeat, component crashes, counter data, other KPI's (key performance indicators), etc. The on-premises server also uses a second and less expensive format (which requires relatively less data and lower storage requirements), such as a compressed format that contains more data than the Bond format, for transmitting high frequency/volume events such as diagnostic data like traces, logs, and other processing/diagnostic data.

Figure 1:
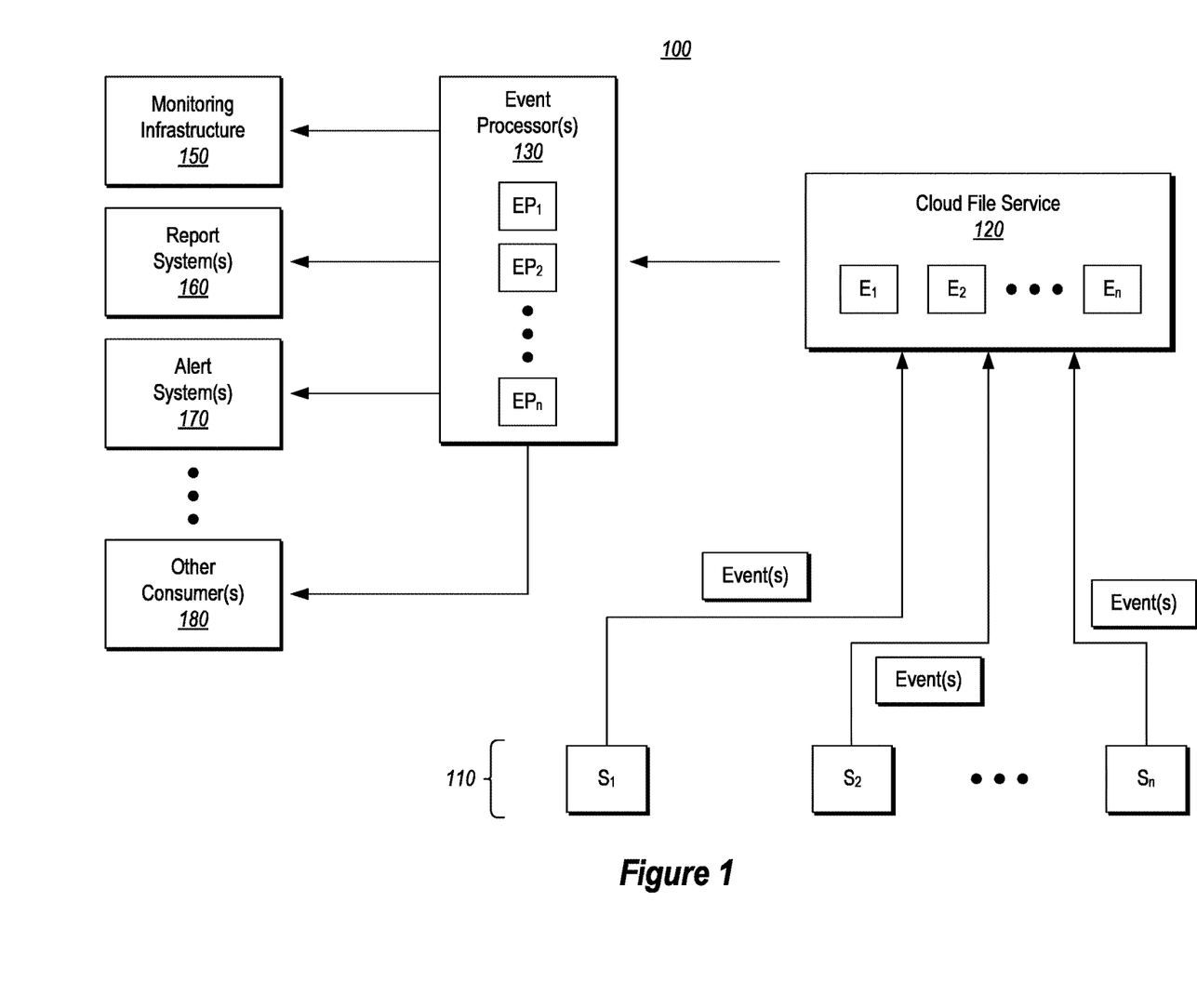
FIG. 1 illustrates a diagram of a system and computing environment that can be used for facilitating the disclosed methods for performing event storage and diagnostic processing within a hybrid cloud environment.

Attention is now directed to FIG. 1, which illustrates one embodiments of a system 100, comprising a hybrid cloud system, in which different on-premises servers (110) are connected to a cloud file service 120 (such as Microsoft's Azure) for processing system events (reflected as both 'Event(s)' and as '$E_1$,' '$E_2$' ... '$E_n$'). In this regard, it will be appreciated that the term hybrid cloud is a term known to those of skill in the art and includes a distributed system in which on-premises servers access some cloud services that are run remotely from the servers, as well as at least some on-premises applications that are run exclusively within the physical confines of an enterprise (e.g., a company's data center), without relying exclusively on applications and other resources running on remotely-based systems accessible only through the cloud services.

In some instances, each of the different servers 110 includes a plurality of different machines that are connected and which collectively form the server. Each server (110)

and, in some instances, each monitored machine (not shown), includes a processor for executing stored computer-executable instructions and one or more storage media for storing the computer-executable instructions. The computer-executable instructions are applications that perform/generate tasks and other detectable events (e.g., perform a transaction, create a function call, execute a script, etc.). Hardware processes performed on the different monitored machines also generate detectable events (e.g., a change to a power state of a machine or component, a signal generated by a sensor, a memory flush or a read/write operation, etc.). At least one application stored on each of the servers is an agent for monitoring the detectable events occurring on the corresponding server.

When events are detected by the monitoring server 110, they can be transmitted to the cloud file service 120 for storage as events ($E_1$, $E_2$ . . . $E_n$). These events are then transmitted to one or more relevant/subscribing consumers (e.g., monitoring infrastructure 150, report system(s) 160, alert system(s) 170 and/or other consumer(s) 180) based on attributes of the different events, as subscribed for. In some instances, the events are processed by event processor(s) 130 (e.g., $EP_1$, $EP_2$ . . . $EP_n$), which are specialized processing modules and routers that query the cloud file service 120 for the events and that (when necessary) format the events into a suitable format desired by the event consumer(s) 180. The event processor(s) 130 also forward the events from the cloud file service 120 to the appropriate event consumer(s) 180, automatically when the events are detected by the event processor(s) 130, and/or at preselected periods/intervals, as subscribed for by the consumer(s) 180.

The consumer monitoring infrastructure 150 is configured to present the events as visual data through user interfaces in response to one or more queries submitted to the user interfaces by a user (e.g., a development team debugger). The consumer report system(s) 160 is a reporting pipeline configured to generate customized and automated reports corresponding to detected events. The consumer alert system(s) 170 is an alerting pipeline that is configured to generate and transmit an alert to one or more cloud systems (e.g., Azure's Incident Management System, administrator systems, or other systems).

Each of the different event consumers can be further configured to correlate different events based on correlation data associated with the events (e.g., correlation vector data), which is appended to the events, as further described herein. Alternatively, the event processor(s) 130 and cloud file service 120 perform the act of correlating related events by the correlation data prior to storing and/or transmitting the events/event records. In other embodiments, the correlation is performed partially by multiple different systems including any combination of the cloud file service 120, event processor(s) 130 and consumers.

It is noted, as previously suggested, there are known problems with existing cloud hybrid systems being unable to track and report monitored events effectively. In particular, current event monitoring systems are configured to either monitor dedicated devices alone, or alternatively, to collectively track events occurring within a distributed cloud process, without isolating the data for the different devices. The current embodiments overcome problems associated with such systems by providing on-premises servers in a hybrid system the ability to process and store events for that on-premises server in an isolated and secure manner, while still enabling a correlation to be made between related events occurring on different server within the hybrid cloud.

For instance, as described in more detail with reference to FIGS. 2 and 3, the servers 110 are configured to run agents that are able to generate event records that are appended with correlation vector data for correlating the events between different servers, while still processing and bundling the event records in such a manner that they can be securely isolated from other servers and while also selectably formatting the event records (based on frequency/type) in such a manner as to reduce processing, transmission and storage overhead, and while also providing checkpoint mechanisms to collect and upload event data associated with failed processing of earlier event records. These features will be described in more detail throughout this disclosure.

Figure 2:
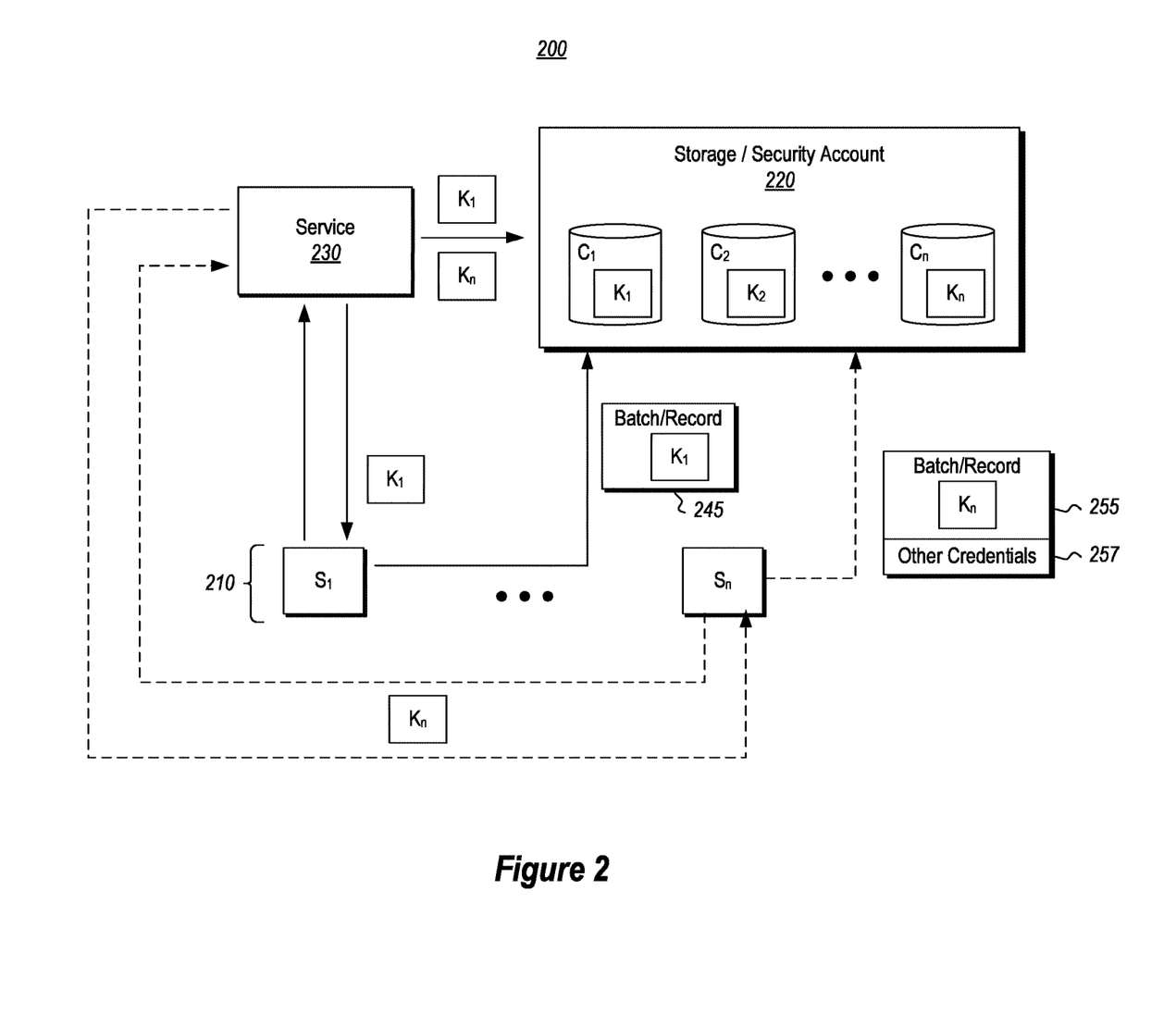
FIG. 2 illustrates a diagram of a system and computing environment that can be used for facilitating the disclosed methods for performing event storage and diagnostic processing within a hybrid cloud environment.

FIG. 2 illustrates an embodiment, similar to the embodiment of FIG. 1, in which a hybrid cloud system 200 includes a cloud service comprising a storage/security account system 220 that is connected to a plurality of different on-premises servers (210, e.g., $S_1$ . . . $S_n$). The storage/security account system 220 can include, for example, an Azure based cloud file storage service, or another cloud-based storage service and can be incorporated within the cloud file service 120 of FIG. 1.

The hybrid cloud system 200 of FIG. 2 also includes another service 230 which can include a certificate or key service that is configured to generate/manage security keys provided to the storage/security account 220 and the different on-premises servers 210. In some instances, the service 230 comprises an Azure file sync service, and will be described in more detail with reference to FIG. 3. The illustrated service 230 can also be incorporated into or include the cloud file service 120 of FIG. 1.

The storage/security account 220 maintains different storage containers (e.g., $C_1$, $C_2$ . . . $C_n$) that are isolated from each other and which are configured to secure the contents of the container with one or more security mechanisms, such as security keys (e.g., $K_1$, $K_2$ . . . $K_n$) that are provided to the storage/security account 220 by the cloud service 230. In some embodiments, the cloud service (230, 320) has full access to the storage service and all containers in the storage service. In some instances, the cloud service utilizes a master key to generate each container in the storage account. Then, the container name and the master key are used to generate the specific container key (e.g., $K_1$, $K_2$ . . . $K_n$) which is provided to the various servers (e.g., $S_1$, $S_2$ . . . $S_n$) associated with the different containers (e.g., $C_1$, $C_2$ . . . $C_n$) and to provide the servers restricted write access to those containers.

Other security checks, in addition to the aforementioned security keys, can also be used to create a dual authentication or double-layered security mechanism for isolating and restricting access to the different containers. The additional security checks can include the use of other credentials, such as tokens maintained by the servers, secret server credentials/passwords, server identifier(s) (e.g., system configuration files/identifiers or hashes of the system configuration files/identifiers), additional security key(s) (asymmetric or symmetric) and/or other credential information.

In some instances, data is submitted to the storage/security account 220 in the form of an event record or a batch of records (e.g., Batch/Record 245) which is signed by a security key (e.g., $K_1$) that corresponds to a particular container (e.g., $C_1$) corresponding to that same server (e.g., $S_1$) and which has a same associated security key (e.g., $K_1$). This way, when data (e.g., Batch/Record 245) is received by the storage/security account 220, the storage/security account 220 can identify which container to put the received Batch/Record 245 into. In other embodiments, the storage service can also use the security key to verify that the content of the received data (e.g., Batch/Record 245) should be written to the corresponding container ((e.g., $C_1$) having the same security (e.g., $K_1$). In some instances, the server 210 specifically identifies the container to store the transmitted data in, such as an explicit identifier within a write request. In other embodiments, the storage/security account 220 makes a determination as to which container to store the received content in, if any, based on determining a correlation between the security key applied to the received data and a corresponding security key of an associated container.

In some instances, as previously discussed, the security mechanisms for ensuring only the appropriate data is stored in the appropriate container can include additional checks, such as requiring other credentials 257 be included with the event record or batch of event records that are received and prior to being processed and/or stored. For instance, Batch/Record 255 is shown to include a security key (e.g., $K_n$) that corresponds to an associated server (e.g., $S_n$), along with other credential information 257. This additional credential information 257 is used to validate the data integrity of the events (i.e., to check whether the events are from the purported server sending the batch of event records).

The storage/security account 220 screens all incoming data (namely the event records and batches of event records) to verify that the incoming data contains the requisite security key(s) and/or other credential(s) to grant access to the corresponding containers associated with the server(s) sending the data. If the received data does not include the correct security keys and/or other credentials, an error will be generated and/or the storage service will refrain from processing and/or storing the received data. This can be particularly helpful to prevent or mitigate against DoS (denial of service) attacks directed at the storage/security account 220.

To further assist in protecting the storage/security account 220 from potential malicious data and attacks, the storage/security account 220 can also perform a cursory examination of the contents of the received event batch/record(s) to determine whether the contents match an expected format type, size requirement, flow pattern or timestamp associated with event records and batches of records that are known to be created by a particular server being monitored and/or that match a previous attribute communicated by the server to the storage/security account in a previously sent validation communication. If there is not a match, the received event data can be ignored. If there is a match, the received event data can be processed and stored within the appropriate container based on the security mechanisms described above.

In some instances, new security keys are generated and transmitted by the service 230 to the servers and storage/security account 220 on a periodic frequency, such as every few hours, or every few minutes, or every few days. Other time periods can also be used, depending on the level of security desired. In some embodiments, the frequency period for generating the security keys for a first server/container pair will be different than the frequency period for generating the security keys for a different server/container pair.

While the present illustration shows only a single container per server, in other embodiments, each server is associated with a plurality of different containers that share the same key. In other embodiments, a single server is issued different keys for different content stored in different containers restricted by the different keys, respectively.

In some instances, the security keys are associated with permissions managed by the storage/security account 220 and which restrict the server's 210 access to the different containers to only write access. In this manner, once the data (e.g., event records) are stored in the containers, the servers are unable to read the stored content. This can help limit the amount of processing being performed by the storage/security account 220 and can further help improve the isolation/security of the containers and stored content.

Figure 3:
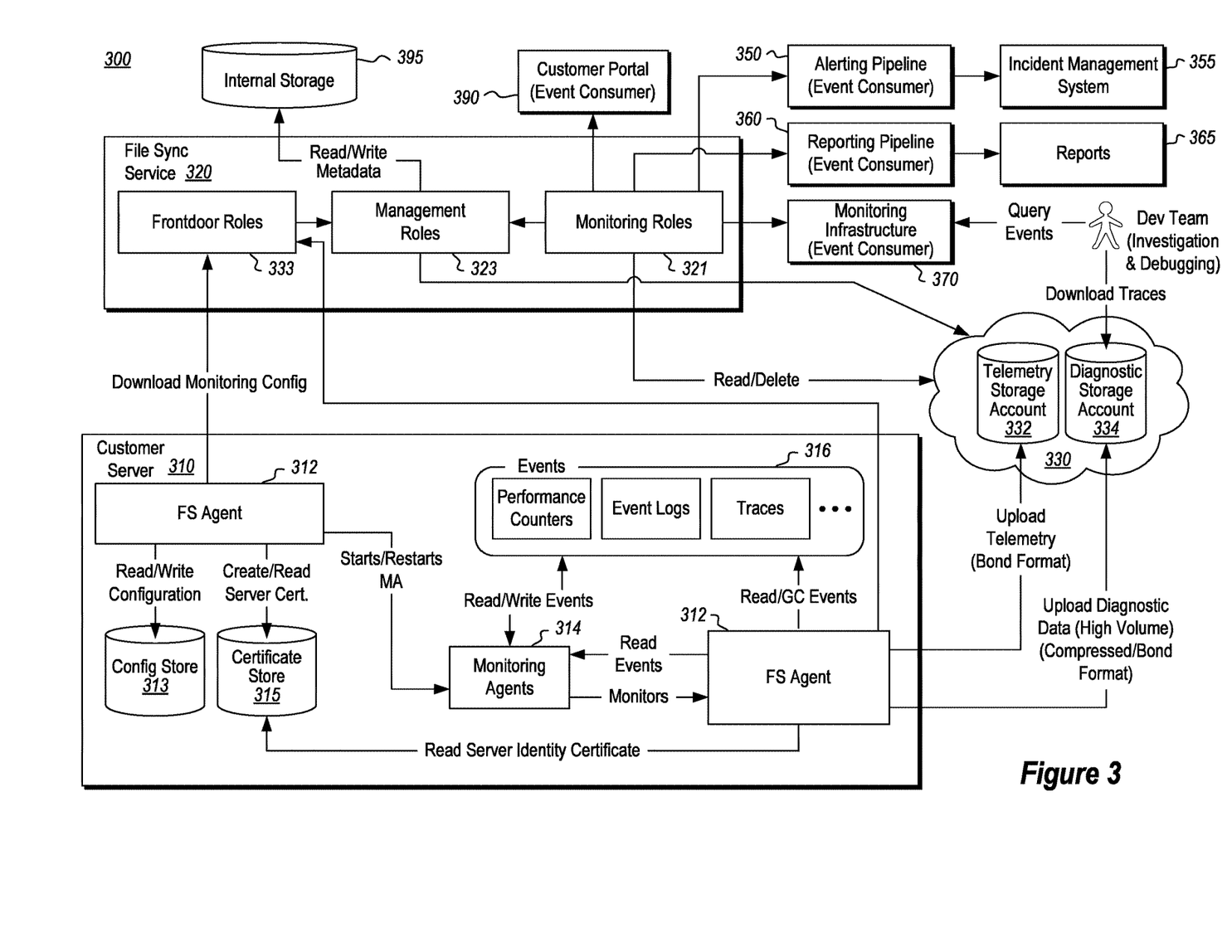
FIG. 3 illustrates a diagram of a system and computing environment that can be used for facilitating the disclosed methods for performing event storage and diagnostic processing within a hybrid cloud environment.

Attention will now be directed to FIG. 3, which illustrates another example of a system 300 configured to provide an extensible, secure and efficient monitoring and diagnostic pipeline for hybrid cloud architectures and, even more particularly, systems and methods for facilitating the manner in which event storage and diagnostic processing is performed in a hybrid cloud environment. For instance, the current system 300 can be a hybrid cloud system in which a cloud file sync service 320 is in communication with another cloud storage service 330 and one or more customer server(s), which can include one or more on-premises servers that are connected and/or disconnected from each other and that are remotely connected to the file sync service 320 and storage service 330 (although only a single customer server 310 is presently shown).

The on-premises servers (e.g., customer server 310) has a file sync agent (e.g., FS Agent 312) that is configured to monitor events 316 that are detectable from one or more machines that are managed by or incorporated within the customer server 310. The machines are not presently shown, but can include any computing device or system connected to the customer server 310.

The events 316 can include any of the aforementioned telemetry or diagnostic events, including but not limited to performance counters, logs, traces KPIs, etc.

To facilitate with the monitoring of the events 316, the FS agent 312 may employ or incorporate one or more monitoring agents 314. The monitoring agents are specifically configured to request event data from the connected machines (not shown). In some instances, a separate monitoring agent is utilized for each type of event and/or each different machine and/or type of system component. In other embodiments, a single monitoring agent observes and detects the data for different types of events, machines and/or components.

In some instances, the monitoring agent(s) 314 gather event data during a predetermined batch period. This predetermined batch period is, in some instances, a batch period of time is repeated at a frequency that is user configurable and may comprises a period of minutes, a period of seconds, a period of hours, or any other period of time. In alternative embodiments, the batch period is based on the occurrence of a counter, such as a predetermined set of computing cycles or the duration of a process, such as a completion of a particular task, transaction or other operation.

Event data that is detected by the monitoring agent(s) 314 during the predetermined batch period is provided to the FS Agent 312. The FS Agent 312 then formats the events/event data into a batch of event records that is subsequently transmitted to the cloud storage service 330. In some instances, the events gathered during the batch period are formatted into two or more different batches, based on the types of events and/or the types of machines/components generating the events.

In some instances, the batches of event records are formatted into one of a plurality of different format types, selectively based on a type of the event records and/or machines or components generating the events. The different formats include different serialization formats, in some instances, such as a Bond format (which is well-known to those of skill in the art) or a compressed format that, in some instances, actually contains more data than the Bond format, while still having a lower storage overhead than the Bond format because it is compressed. It will be appreciated, however, that other formats can also be used, including JSON, XML, SOAP, etc.

In some instances, the Bond format is used for telemetry data events, while the compressed format (which can be a compressed Bond format that, in some instances, contains more data that is contained in the Bond format, only in a compressed format) is used for diagnostic data events.

The cloud storage service 330 may, in some instances, store different types of records in different types of containers (even if they are received from the same server), based on a type of formatting used to format the batch of records. For instance, a single server may be associated with two different containers at the cloud storage service 330, including a telemetry storage account 332 for telemetry data and a diagnostic storage account 334 for diagnostic data. The security key associated with each of these storage accounts (332, 334) can be the same security key or a different security key. When different security keys are utilized, the server will be provided a copy of both security keys and will selectively apply the appropriate security key to the batch of event records based on type of event and formatting used to format the batch of event records.

In some instances, the FS Agent 312 signs the different batches of event records with a security key that is received from the file sync service 320, or other certificate authority that utilizes a corresponding security key with the cloud storage service 330 to ensure the record data is stored in a correspondingly appropriate container (as described in reference to FIG. 2).

In some instances, FS Agent 312 obtains the security key from the cloud file sync service 320, in response to a request from the server, after the server first presents an appropriate certificate to the cloud file sync service 320 that authenticates the system/server 300. This certificate is stored, in some instances, in the certificate store 315. The certificate is generated by the server, in some instances, during server registration processes with the frontdoor roles 333 which acts as a gateway for requests that come to cloud file sync service 320. The certificate can thereafter be used by the server to communicate with cloud file sync service 320 for all future requests.

In some instances, the customer server 310 also stores configuration data within a configuration store 313, which can maintain configuration files and other credential information that can be used to further sign/secure the batches of event records, as previously described. The configuration store 313 can also maintain configuration instructions for controlling how the monitoring agents 314 collect the event data and/or how the FS Agent 312 formats the batch of event records.

In some embodiments, the monitoring agents 314 generate event records for the different monitored events that are detected during a prescribed batch period. Each record includes event data that defines the event. The event record is also appended, in some instances, with additional correlation vector data that can be used in later processes for correlating the event record with one or more other event record detected at the customer server 310 or that is accessed by the file sync service from another server (not shown) in the hybrid cloud system 300.

The appended correlation vector data can be appended to the different event records by the monitoring agent(s) 314 and/or the FS Agent 312. In some instances, the correlation vector data includes at least one or more of a machine identifier, a server identifier, a subscription identifier, an agent identifier, a cluster identifier, a geolocation identifier, a resource identifier, or an environmental condition existing within the hybrid cloud system 300 during the detection of the event data.

In some embodiments, the file sync service 320 utilizes the monitoring roles 321 to access the data from the cloud storage service 330 according to subscriptions that are managed by the monitoring roles 312 and as subscribed for by one or more customers. These customers may include, for example, a customer portal 390 (which is configured to allow querying of the different events directly from the cloud storage service 330. The customers may also include monitoring infrastructure 370 (described in referenced to FIG. 2), which can also provide reports and interfaces for querying for different events.

Other customers include reporting pipeline 360, which is used to generate automated and manually requested reports 365 corresponding to different types of events and/or events corresponding to different types of machines or servers.

Yet other customers include alerting pipeline 350, which is configured to generate or trigger the generation of alerts based on detected events. For instance, an alert might be generated in response to detecting a particular type of event or a plurality of events that are of a particular type and that occur on a particular machine and/or that occur within a predetermined period of time. Other alerts can also be triggered in response to different event conditions.

The file sync service 320 also includes a management roles 323 for defining the different storage containers and constraints for restricting access to the storage containers. In some instances, the management roles 323 creates and manages the security keys that are provided to the storage service 330. The management roles 323 also manages the requirements for other credentials that may be required to access the different storage containers.

In some instances, the management roles 323 and frontdoor roles 333 obtain from and/or store at internal storage 395 the various credential information and security keys described herein. In some instances, the security keys and credential information may be received from one or more third party and may be provided to and/or updated at the internal storage 395.

Figure 4:
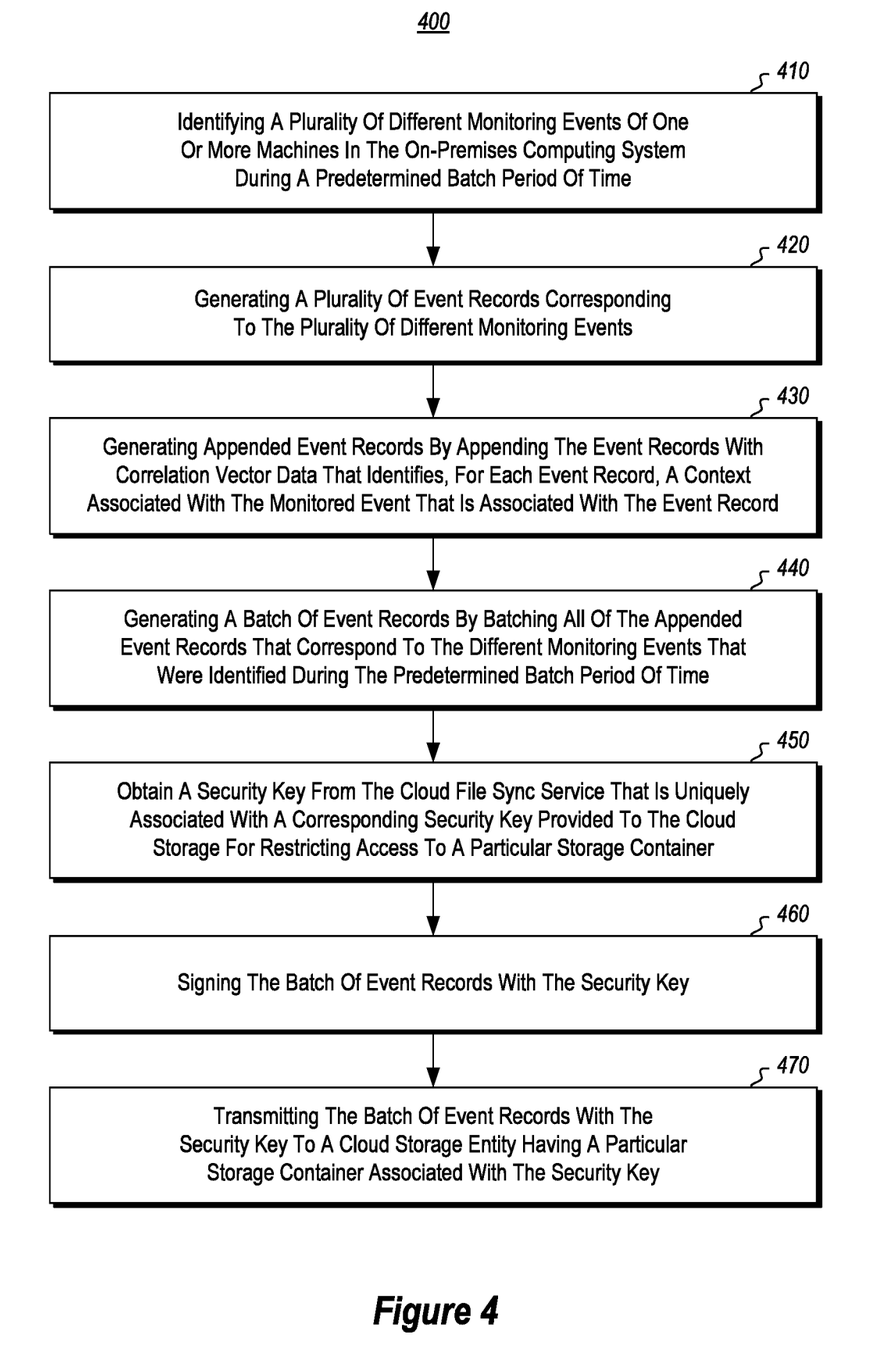
FIG. 4 illustrates a flow diagram that includes various acts associated with disclosed methods for performing event storage and diagnostic processing within a hybrid cloud environment.

Attention will now be directed to FIG. 4, which illustrates a flow diagram of various acts that are included within various embodiments of the disclosed methods and systems for providing an extensible, secure and efficient monitoring and diagnostic pipeline for hybrid cloud architectures and, even more particularly, for facilitating the manner in which event storage and diagnostic processing is performed in a hybrid cloud environment.

The acts illustrated in the flow diagram 400 are preferably implemented by an on-premises computing system (e.g., customer server 310) that is operating in a hybrid cloud environment (e.g., system 300), which is connected to a cloud storage (e.g., cloud storage service 330, which can include cloud file service 120 and/or storage/security account 220) and to a cloud file sync service (e.g., file sync service 320). The customer server also includes, although not shown in FIG. 3, one or more processors (e.g., hardware processors) and one or more computer-readable media (e.g., RAM and/or ROM) having stored thereon instructions that are executable by the one or more processors to configure or cause the computer system to implement a method for performing event storage and diagnostic processing in the hybrid cloud environment in accordance with the functionality disclosed herein.

In some instances, the on-premises computing system (e.g., server 310) performs at least the following acts. First, the computing system identifies a plurality of different monitoring events of one or more machines in or associated with the on-premises computing system during a predetermined batch period of time (act 410), as previously described. Next, the computing system generates a plurality of event records corresponding to the plurality of different monitoring events detected during the predetermined batch period of time (act 420). This may be accomplished, for example, with the monitoring agents 314 and/or the FS Agent 312. This act also includes determining a format to configure each event record with, selectively based on a type of monitoring event associated with each event record, as previously described.

The computing system also generates appended event records by appending the event records with correlation vector data that identifies, for each event record, a context associated with the monitored event that is associated with the event record (act 430), as previously described.

Next, the computing system generates a batch of event records by batching all of the appended event records that correspond to the different monitoring events that were identified during the predetermined batch period of time (act 440). This may include generating different batches based on different event type and/or machine.

This batching may also include serializing the different batches into different formats, based on the determined formats to use for the different types of events. Alternatively, the records can be formatted prior to batching.

In some embodiments, the computing system also obtains (act 450) and uses a security key from the cloud file sync service to sign (act 460) the batch of event records. This security key is uniquely associated with a corresponding security key provided to the cloud storage for restricting access to a particular storage container associated with the on-premises computing system and that is managed by the cloud storage, as previously described.

Next, the batch of event records is transmitted to the cloud storage entity (act 470), with the security key and/or any other requisite credential information (if any is required) and which causes the batch of event records to be stored in the particular storage container.

In some instances, it is later determined that some of the event data is not properly stored or that there was an error that occurred during the processing and/or storage of the batch of event records. To help address this potential problem, the current embodiments provides two different mechanisms for ensuring data integrity and to help protect against malicious activity.

In a first safety mechanism, the server will generate a new/subsequent batch of records that includes the plurality of event records corresponding to a plurality of different monitoring events (including some of the original events detected during the original predetermined batch period of time, as well as a new plurality of event records corresponding to a new plurality of different monitoring events detected during an extended or different time than the predetermined batch period of time). For instance, suppose the server failed to collect or upload a batch of records for the first batch period of time (e.g., a predetermined period of five minutes). In this instance, the extended or different time for the next batch of records may be 10 minutes, including the next five minutes as well as the 5 minutes for the preceding first batch period of time and in which records/events from the first batch period of time are obtained from temporary storage and included with newly detected events occurring during the remaining five minutes of time (for the 10 total minutes of time). This way, the new/subsequent batch of records will include the events/records that were not properly collected, batched or uploaded.

To facilitate the creation of subsequent batches having a greater/extended batch period of time, the computing system may store monitored events/records for one or more different cycles of batched event records at a local store (not shown or which may be included in configuration store 313) and which is flushed periodically and/or overwritten with new event records after a set period of time or after a predetermined quantity of batches of event records are transmitted to the cloud storage service 330.

Then, the new batch of records can be composed of some new and some old event records, from two different batch periods of time. Alternatively, the same batch of event records that was previously sent will be resent with the same set of event records. The new batch of records can then be transmitted to the cloud storage service with the same security key that was originally used, or with a new security key, if it has been updated/replaced by the file sync service.

In some instances, when a set of event records is retransmitted, in the same set or with additional event records, the batch of event records will sometimes be formatted/serialized with a different format to provide additional data or less data. For instance, a first transmission of a batch of records might be transmitted in a Bond format and then later transmitted in a compressed Bond format. Alternatively, the first transmission may be in a compressed Bond format or other format and then retransmitted in a Bond format or another different format.

In some instances, the foregoing process of extending the period for the subsequent batch of records can also be triggered by obtaining an error message from the storage service that indicates the batch of records was not received and/or did not upload properly. In other embodiments, the determination is made when the computing system 310 fails to receive an acknowledgement of a successful save of a batch of records within a predetermined period of time.

In some instances, a second safety mechanism is provided to safeguard against security threats such as DDoS attacks. This second safety mechanism includes the cloud service 320 performing validations of the received batch of records to ensure that the received batch of records matches an expected size, rate of upload, flow pattern, signature, security key, hash, and/or other batch attribute. In some instances, the computing system notifies the storage service of the expected batch attribute in a separate communication from the batch of records (either directly sent from the computing system 310 and/or indirectly through a communication received by the file sync service 320). Then, when the batch of records is received, the attribute(s) of the batch of records can be compared to the expected attribute(s) identified in the separate communication. When they do not match, an error can be generated and sent to the computing system and/or the storage service can refrain from processing/storing the batch of records and from confirming successful storage.

As previously discussed, the disclosed embodiments also include techniques for stitching events together by correlating two or more events by matching correlation vector data appended to the event records. This stitching can be performed by the file sync service 320, the storage service 330 or the event consumers (e.g., alerting pipeline 350, reporting pipeline 360, monitoring infrastructure 370 and customer portal 390). This process involves, in some instances, examining the event records and matching at least one event record in a first batch of records with at least one different event record that is generated and stored separately from the batch of records, based on the correlation vector data appended to each of the event records. This correlation vector data may include, for example, at least one of a machine identifier, a server identifier, a subscription identifier, an agent identifier or a cluster identifier. The correlation vector data may also, alternatively or additionally, include at least one of a computing environment condition existing during a monitored event or a resource being utilized during processing of the monitored event (such as a time, a bandwidth, application(s) running, or other environmental computing conditions).

In view of the foregoing, it will be appreciated that the current embodiments provide various methods and systems for providing an extensible, secure and efficient monitoring and diagnostic pipeline for hybrid cloud architectures and, even more particularly, for facilitating the manner in which event storage and diagnostic processing is performed in a hybrid cloud environment. In some instances, these embodiments may be used to help overcome some of the technical difficulties and problems associated with existing techniques for performing event record storage and diagnostic processing within hybrid cloud environments. For instance, disclosed embodiments can be utilized to help improve correlation between different related events detected by different/remote servers, improve security of stored event records, improve handling of event records (particularly during transmission) to reduce computational loads associated with handling event records, and improving techniques for mitigating against errors that can occur during the event record processing.

Embodiments of the present invention may comprise or utilize a special purpose or general-purpose computers including computer hardware, as discussed in greater detail below. These computers include the disclosed computing systems and devices and include physical and other computer-readable media for carrying or storing computer-executable instructions and/or data structures, as well as processors for executing the stored computer-executable instructions.

The computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An on-premises computing system that is operating in a hybrid cloud environment, which is connected to a cloud storage and to a cloud file sync service, comprising:
one or more processors; and
one or more hardware storage devices having stored thereon instructions that are executable by the one or more processors to configure the computer system to perform event storage and diagnostic processing in the hybrid cloud environment, and by at least configuring the computer system to perform the following:
identify a plurality of different monitoring events of one or more machines in the on-premises computing system during a predetermined batch period of time;
generate a plurality of event records corresponding to the plurality of different monitoring events detected during the predetermined batch period of time, wherein generating the plurality of event records includes determining a format to configure each event record with, selectively based on a type of monitoring event associated with each event record, and wherein the plurality of event records include at least two different event record format types;
generate appended event records by appending the event records with correlation vector data that identifies, for each event record, a context associated with the monitored event that is associated with the event record;
generate a batch of event records by batching all of the appended event records that correspond to the different monitoring events that were identified during the predetermined batch period of time;
obtain a security key from the cloud file sync service that is uniquely associated with a corresponding security key provided to the cloud storage for restricting access to a particular storage container associated with the on-premises computing system and that is managed by the cloud storage, the particular storage container being one of a plurality of storage containers that are managed by the cloud storage, the security key being operable, when the batch of event records is signed with the security key, to identify the particular storage container from the plurality of storage containers to put the batch of event records into;
sign the batch of event records with the security key; and
transmit the batch of event records with the security key to the cloud storage entity and which causes the batch of event records to be stored in the particular storage container.

2. The computing system of claim 1, wherein the instructions are further executable by the one or more processors to configure the computer system to further perform the following:
determine that the batch of records is to be replaced;
generate a new batch of records that includes the plurality of event records corresponding to the plurality of different monitoring events detected during the predetermined batch period of time, as well as a new plurality of event records corresponding to a new plurality of different monitoring events detected during a different time than the predetermined batch period of time; and
transmit the new batch of records to the cloud storage with the security key.

3. The computing system of claim 2, wherein the determining that the batch of records is to be replaced is based on a communication that is received by the on-premises computing system and that indicates that the batch of records is to be replaced.

4. The computing system of claim 1, wherein the at least two different event record format types include a bond format type and a compressed format type that contains more data than is included in the bond format type, but which is compressed, wherein the bond format type is used to format low volume monitoring events and wherein the compressed format type is used to format high volume monitoring events.

5. The computing system of claim 1, wherein the correlation vector data is used to match at least one event record in the batch of records with at least one different event record that is generated and stored separately from the batch of records.

6. The computing system of claim 5, wherein the correlation vector data includes at least one of a machine identifier, a server identifier, a subscription identifier, an agent identifier or a cluster identifier.

7. The computing system of claim 5, wherein the correlation vector data includes at least one of a computing environment condition existing during a monitored event or a resource being utilized during processing of the monitored event.

8. The computing system of claim 1, wherein the security key is operable to restrict access to the particular storage container to only write access by the on-premises computing system.

9. The computing system of claim 1, wherein the instructions are further executable by the one or more processors to configure the system to further perform the following:
serialize the appended event records prior to transmitting the batch of event records.

10. The computing system of claim 1, wherein the instructions are firther executable by the one or more processor to configure the computer system to perform the following:
sign the batch of records with a digital signature associated with another security key associated with the on-premises computing system and that is distinguished from the security key that is uniquely associated with the corresponding security key provided to the cloud storage.

11. A method implemented by an on-premises computing system for performing event storage and diagnostic processing in a hybrid cloud environment that includes a cloud storage and a cloud file sync service, the on-premises computing system comprising one or more processors and one or more hardware storage devices having stored instructions that are executable by the one or more processors to implement the method, wherein the method includes the on-premises computing system performing at least the following:
identifying a plurality of different monitoring events of one or more machines in the on-premises computing system during a predetermined batch period of time;
generating a plurality of event records corresponding to the plurality of different monitoring events detected during the predetermined batch period of time, wherein generating the plurality of event records includes determining a format to configure each event record with, selectively based on a type of monitoring event associated with each event record, and wherein the plurality of event records include at least two different event record format types;

generating appended event records by appending the event records with correlation vector data that identifies, for each event record, a context associated with the monitored event that is associated with the event record;

generating a batch of event records by batching all of the appended event records that correspond to the different monitoring events that were identified during the predetermined batch period of time;

obtain a security key from the cloud file sync service that is uniquely associated with a corresponding security key provided to the cloud storage for restricting access to a particular storage container associated with the on-premises computing system and that is managed by the cloud storage, the security key being operable to identify the particular storage container as a storage location for the batch of event records when the batch of event records is signed with the security key;

signing the batch of event records with the security key; and transmitting the batch of event records with the security key to the cloud storage entity and which causes the batch of event records to be stored in the particular storage container.

12. The method of claim 11, wherein the method further includes:
determining that the batch of records is to be replaced;
generating a new batch of records that includes the plurality of event records corresponding to the plurality of different monitoring events detected during the predetermined batch period of time, as well as a new plurality of event records corresponding to a new plurality of different monitoring events detected during a different time than the predetermined batch period of time; and
transmitting the new batch of records to the cloud storage with the security key.

13. The method of claim 11, wherein the at least two different event record format types include a bond format type and a compressed format type that contains more data than is included in the bond format type, but which is compressed, wherein the bond format type is used to format low volume monitoring events and wherein the compressed format type is used to format high volume monitoring events.

14. The method of claim 11, wherein the correlation vector data is used to match at least one event record in the batch of records with at least one different event record that is generated and stored separately from the batch of records and wherein the correlation vector data includes at least one of a machine identifier, a server identifier, a subscription identifier, an agent identifier, a cluster identifier, a computing environment condition existing during a monitored event, or a resource being utilized during processing of the monitored event.

15. The method of claim 11, wherein the security key is operable to restrict access to the particular storage container to only write access by the on-premises computing system.

16. The method of claim 11, wherein the method further includes:
serializing the appended event records prior to transmitting the batch of event records.

17. The method of claim 11, wherein the method further includes the on-premises computing system signing the batch of records with a digital signature associated with another security key associated with the on-premises computing system and that is distinguished from the security key that is uniquely associated with the corresponding security key provided to the cloud storage.

18. A computer program product comprising one more hardware storage device having stored instructions that are executable by the one or more processors of a computing system for configuring the computing system to performing the following:
identify a plurality of different monitoring events of one or more machines in the computing system during a predetermined batch period of time;
generate a plurality of event records corresponding to the plurality of different monitoring events detected during the predetermined batch period of time, wherein generating the plurality of event records includes determining a format to configure each event record with, selectively based on a type of monitoring event associated with each event record, and wherein the plurality of event records include at least two different event record format types;
generate appended event records by appending the event records with correlation vector data that identifies, for each event record, a context associated with the monitored event that is associated with the event record;
generate a batch of event records by batching all of the appended event records that correspond to the different monitoring events that were identified during the predetermined batch period of time;
obtain a first security key from the cloud file sync service that is uniquely associated with a corresponding security key used to restrict access to a particular storage container associated with the computing system, the first security key being operable to identify the particular storage container as a storage location for the batch of event records when the batch of event records is signed with the security key;
sign the batch of event records with the security key; and
transmit the batch of event records with the security key for storage in the particular storage container.

19. The computer program product of claim 18, wherein the stored instructions are further executable by the one or more processors for configuring the computing system to perform the following:
determine that the batch of records is to be replaced;
generate a new batch of records that includes the plurality of event records corresponding to the plurality of different monitoring events detected during the predetermined batch period of time, as well as a new plurality of event records corresponding to a new plurality of different monitoring events detected during a different time than the predetermined batch period of time; and
transmit the new batch of records with the security key for storage in the storage container.

20. The computer program product of claim 19, wherein the stored instructions are further executable by the one or more processors for configuring the computing system to perform the following:
sign the batch of records with a digital signature associated with a second security key associated with the computing system and that is distinguished from the first security key.

* * * * *